US008228760B2

(12) United States Patent
Jones et al.

(10) Patent No.: US 8,228,760 B2
(45) Date of Patent: Jul. 24, 2012

(54) AIRBORNE LASER-ACOUSTIC MINE DETECTION SYSTEM

(75) Inventors: Theodore G. Jones, Alexandria, VA (US); Tsih C. Tang, Great Falls, VA (US); Steven L. Means, Owings, MD (US); Edward R. Franchi, Alexandria, VA (US); Kwang B. Yoo, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 158 days.

(21) Appl. No.: 12/348,925

(22) Filed: Jan. 6, 2009

(65) Prior Publication Data

US 2009/0201763 A1 Aug. 13, 2009

Related U.S. Application Data

(60) Provisional application No. 61/027,872, filed on Feb. 12, 2008.

(51) Int. Cl.
*G01H 9/00* (2006.01)
(52) U.S. Cl. ............................. 367/128; 367/149; 367/5
(58) Field of Classification Search .................. 367/3, 5, 367/128, 149
See application file for complete search history.

(56) References Cited

U.S. PATENT DOCUMENTS

| | | | |
|---|---|---|---|
| 3,392,368 A | | 7/1968 | Brewer et al. |
| 3,783,441 A | * | 1/1974 | Slawsky ........................... 367/5 |
| 3,953,822 A | * | 4/1976 | Vilkomerson ................. 367/11 |
| 4,991,149 A | * | 2/1991 | Maccabee ..................... 367/128 |
| 5,357,063 A | * | 10/1994 | House et al. .................. 181/108 |
| H0001618 H | * | 12/1996 | Blume .............................. 367/5 |
| 5,646,907 A | | 7/1997 | Maccabee et al. |
| 6,069,843 A | * | 5/2000 | DiMarzio et al. ............. 367/128 |
| 6,813,218 B1 | * | 11/2004 | Antonelli et al. ................. 367/3 |
| 7,259,864 B1 | | 8/2007 | Antonelli et al. |
| 7,260,023 B2 | | 8/2007 | Jones et al. |
| 2009/0103083 A1 | * | 4/2009 | Kremeyer ..................... 356/317 |

OTHER PUBLICATIONS

Antonelli et al., "Experimental Investigation of Optical, Remote, Aerial Sonar," Proc. 2002 Oceans MTS/IEEE Conf., 4 (Oct. 2002) 19491955.
Blackmon et al., "Remote, Aerial, Opto-acoustic Communications and Sonar," Proc. SPIE Conf. on Sensors and C3I for Homeland Security and Homeland Defense IV, 5778 (2005) 800.

* cited by examiner

*Primary Examiner* — Ian Lobo
(74) *Attorney, Agent, or Firm* — Amy Ressing; Joslyn Barritt

(57) ABSTRACT

A system and method is provided for using acoustical pulses generated from an airborne laser source to locate objects under water. An array of acoustic sensors, such as passive sonobuoys at the ocean surface, is deployed in known or determinable locations by aircraft. Each area surrounded by acoustic sensors comprises a search cell, within which sonar scattering data can be used to locate objects. Following sonobuoy deployment, the aircraft uses the laser to rapidly generate many laser-acoustic pulse sources within each search cell, which in turn generate spherical acoustic pulses traveling through the water. The acoustic sensors receive the acoustic pulses, either on a direct path or on a scattered path after the pulse strikes an underwater object. The sensors record the acoustic signatures of the received pulses and transmit data of the recorded acoustic pulses to a processor such as processor on a nearby ship. The processor transforms the data of the acoustic signatures, together with data of the known locations of the acoustic sensors and the locations of the laser-acoustic pulse sources, into data of a location of the underwater objects.

16 Claims, 5 Drawing Sheets

Airborne Laser-Acoustic Mine Detection

AIRBORNE LASER-ACOUSTIC MINE DETECTION SYSTEM

CROSS-REFERENCE

This application claims the benefit of priority based on U.S. Provisional Patent Application No. 61/027,872 filed on Feb. 12, 2008, the entirety of which is hereby incorporated by reference into the present application.

TECHNICAL FIELD

The present invention relates to detection of underwater objects using acoustical pulses generated from laser pulses.

BACKGROUND

There has been increased interest in the use of lasers for remote detection of underwater objects. Such technology is of high interest to the United States Navy for uses such as mine detection, location, and identification, and has significant potential for civilian use in detecting other underwater objects and seafloor features as well.

Conventional sonar systems rely on acoustical pulses generated from arrays of acoustic transducers towed through the water using either a ship or a helicopter. Towing speeds for such systems are limited to a few tens of knots, and therefore covering a large area can take considerable time and resources. Lasers, on the other hand, can be deployed from aerial sources such as helicopters and therefore can enable the search of much larger areas in much less time than conventional ship-based sonar systems. Additionally, the availability of suitable high repetition rate lasers, and the ease of directing laser beams with moveable mirrors, allow for rapid generation of acoustic sources over a large area and the efficient use of multi-static acoustic scattering sonar techniques. Thus, such systems can enable search rates that are several orders of magnitude faster than conventional sonar systems.

The Navy's Airborne Laser Mine Detection System (ALMDS) is an all optical system that uses LIDAR (Light Detection and Ranging) technology to detect, localize, and identify objects such as mines underwater.

Another technique developed by the Navy is an opto-acoustic technique using both laser acoustic generation and laser-Doppler vibrometry for receiving scattered acoustic pulses. See U.S. Pat. No. 7,259,864 to Antonelli et al. A related all-optical technique is outlined in Antonelli et al., "Experimental Investigation of Optical, Remote, Aerial Sonar," *Proc.* 2002 *Oceans MTS/IEEE Conf,* 4 (Oct. 2002) 19491955 and in Blackmon et al., "Remote, Aerial, Opto-acoustic Communications and Sonar," *Proc. SPIE Conf on Sensors and C3I for Homeland Security and Homeland Defense IV,* 5778 (2005) 800.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

The present invention includes a system and method for using acoustical pulses generated from an airborne laser source to identify and locate targets under water. An array of acoustic sensors, such as passive sonobuoys at the ocean surface, is deployed by aircraft so that three or more acoustic sensors are within a predefined range from objects to be detected. The position of the acoustic sensors is known at the time of deployment or can be determined after deployment, for example by including a global positioning system (GPS) receiver in each sensor or by determining acoustic travel times from multiple known laser-acoustic source locations to each sensor. Each area surrounded by three or more acoustic sensors comprises a search cell, within which sonar scattering data can be used to locate objects. The maximum size of the search cells can be determined by parameters such as the acoustic source power spectrum, a target object's acoustic reflectivity, and the corresponding acoustic attenuation distance.

Following deployment of the acoustic sensors, an aircraft uses the laser to rapidly fire into the water in a known pattern within each search cell. Each laser pulse forms an acoustic pulse comprising a spherical shell of high pressure that expands outwardly in all directions at the speed of sound. As it travels through the water, the thus-generated acoustic pulse can be received by one or more of the acoustic sensors, either on a direct path from the laser-acoustic source or on a scattered path after being reflected off an underwater object. Each of the received pulses has an associated acoustic signature which is recorded by the acoustic sensor receiving the pulse. The acoustic sensors can then transmit data of the acoustic signatures of the received pulses to a processor such as a general or special purpose computer having appropriate software located on an aircraft or on a nearby ship.

Using the acoustic signature data received from the acoustic sensors, along with data regarding the positions of the laser-acoustic pulse sources and the acoustic sensors, the processor can determine travel times of the received acoustic pulses and whether a pulse was received on a direct or a scattered path. Data regarding travel times for acoustic pulses received on a direct path can be processed to verify the locations of the laser-acoustic pulse sources. Data regarding the travel time for acoustic pulses scattering off an underwater object can be processed to locate that that underwater object. By processing data regarding the travel time needed for scattered acoustic pulses from three or more known laser-acoustic pulse source locations to scatter off an underwater object and be received by acoustic sensors at known positions, the object's position can be uniquely determined. Using this system, high-probability locations for any underwater targets within a search cell can be obtained.

DETAILED DESCRIPTION

Figure 1:
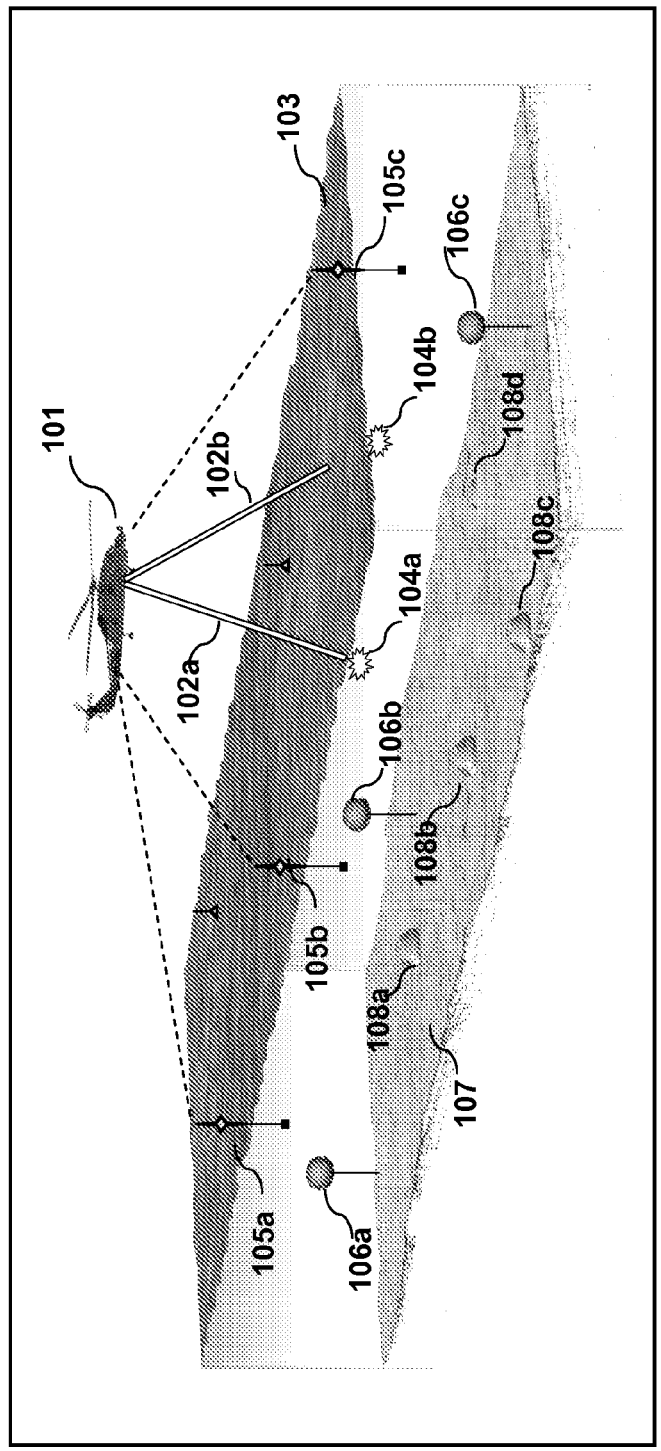
FIG. 1 depicts an exemplary embodiment of the Airborne Laser-Acoustic Mine Detection System of the present invention.

The aspects and features summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

The present invention provides an Airborne Laser-Acoustic Mine Detection (ALAMDS) system that uses an airborne laser repeatedly firing into the water in a known pattern. Each laser pulse forms an acoustic pulse comprising a spherical shell of high pressure that expands outwardly in all directions at the speed of sound. A set of acoustic sensors, such as passive sonobuoys at the ocean surface, can be arranged in an array of known or determinable positions and used to receive these acoustic pulses, both those that are received by the sensor via a direct path and those that are received after being scattered from an underwater target. The sensors can record the travel times of these direct-path and scattered acoustic pulses, and data regarding these travel times can then be transmitted from the receivers to a processing site, for example, on the aircraft operating the acoustic-generating laser system or on a nearby ship, for analysis. With three or more travel times from known acoustic source locations scattered off a target to receivers at known positions, the target's position can be uniquely determined. The error in the estimated target position decreases as the number of received acoustic pulses having different travel times scattered off the target via independent paths increases. Thus, the target location analysis can benefit from the potentially high repetition rate and broad coverage area of the laser acoustic source of the present invention.

An acoustic pulse used in the method of the present invention can be generated by an airborne laser any of a number of different ways, some of which are described below. It should be noted, however, that any method of generating an acoustic pulse from a laser source can be used in the present invention, and that the method described herein is not dependent on any particular manner of generating an acoustic pulse from a laser source.

For example, an acoustic pulse can be generated on the ocean surface by using a suitably focused Q-switched pulsed laser beam such as that used in the Airborne Laser Mine Detection System discussed above. This technique uses a high repetition rate pulsed laser which can have each pulse directed by a rapidly steerable mirror to a selected location at the ocean surface. The laser pulse is then absorbed in a thin layer near the water surface, either via laser-induced ionization and plasma heating or via linear optical absorption of water. As a result of the absorption of the laser pulse energy, the heated water volume expands and generates an acoustic pulse. See, e.g., U.S. Pat. No. 3,392,368 entitled "Ultrasonic and Hypersonic Sound Generator," which is incorporated by reference herein.

Another laser acoustic source that can be used in the method of the invention has been developed by the United States Navy. See U.S. Pat. No. 7,260,023, entitled "Remote Underwater Laser Acoustic Source," which shares a common inventor with the present invention and is incorporated by reference herein in its entirety. In the technique of the '023 patent, a laser source can generate acoustic pulses either near the surface or several meters below the surface, using controlled optical compression techniques. As described in the '023 patent, a laser pulse is fired into the water, the pulse being configured to self-focus and/or self-compress as it travels through the water. Photoionization and plasma heating of the water within the focused and compressed laser pulse then can occur to form a laser-acoustic pulse source having a predetermined desired shape at a controlled and predetermined desired underwater location, and a controlled and predetermined acoustic pulse be generated therefrom. As described in the '023 patent, such flexibility can allow the use of an arbitrary 3-D array of acoustic point sources for acoustic phase-front shaping and beam-forming, for example as used in scanning sonar systems using conventional acoustic transducers. This technique also can be used to generate acoustic pulses near a shallow seafloor for location of shallow buried objects or to generate acoustic pulses across a thermocline. Comprehensive characterization of such laser acoustic sources is underway at the United States Naval Research Laboratory.

Irrespective of the technique used to generate the acoustic pulse, laser-generated acoustic pulses can be used in the system and method of the present invention to locate underwater objects such as mines, as described below in the context of the Figures accompanying and forming a part of this disclosure.

FIG. 1 depicts an overview of an exemplary embodiment of the ALAMDS concept for sonar search of floating and shallow-buried mines. As seen in FIG. 1, an airborne platform such as helicopter 101 over a body of water such as the ocean can fire one or more laser pulses 102a, 102b which can penetrate below the surface 103 of the water to generate corresponding laser-acoustic pulse sources 104a and 104b. Laser-acoustic pulse sources 104a and 104b each can create an acoustic pulse that travels through the water. These acoustic pulses can then be received by one or more acoustic sensors, such as sensors mounted on sonobuoys 105a, 105b, or 105c that have been placed in the water in a known or determinable pattern. The acoustic pulses can also strike and be scattered from one or more objects in the water or under the seafloor 107. For example, one or more of the acoustic pulses generated by laser-acoustic pulse sources 104a and 104b can strike and be scattered from one or more of floating mines 106a, 106b, or 106c. In addition, as described in more detail below, the acoustic pulse generated by a laser source as described herein can strike and be scattered not only from targets that are on the seafloor 107, such as mines 108a, 108b, or 108c, but also from targets that are buried under the seafloor such as buried mine 108d.

As noted above, acoustic sensors on sonobuoys 105a, 105b, and 105c can receive the direct and scattered acoustic pulses produced by the laser-acoustic pulse sources 104a, 104b and can record the acoustic signatures of the received acoustic pulses.

Transmitters on sonobuoys 105a, 105b, and 105c can then transmit data regarding the acoustic signatures of the received acoustic pulses to a processor (not shown), such as a processor on helicopter 101, for processing. A processor suitable for use in the system and method of the present invention can include a processor such as a general or special purpose computer having appropriate specialized software, and can be located near the site of the sonobuoys 105a, 105b, and 105c, e.g., on helicopter 101 or on a nearby ship, or can be at a more-remote site such as at a land-based station. The processor also can receive data regarding the position of the acoustic sensors, either at the time the acoustic signature data is transmitted or otherwise, for example, via GPS units loaded on sonobuoys 105a, 105b, and 105c. In addition, data of the location of the laser-acoustic pulse sources 104a, 104b can be generated, for example, as the laser pulses 102a, 102b are being fired, and that data also is transmitted to the processor.

Using the acoustic signature data received from the acoustic sensors, along with the data regarding the locations of the laser-acoustic pulse sources 104a, 104b and the acoustic sensors 105a, 105b, and 105c, the processor can determine travel times of the received pulses and whether a pulse was received on a direct or a scattered path. The data regarding travel times for pulses received on a direct path can be processed to verify the locations of the laser-acoustic pulse sources 104a, 104b.

In accordance with the present invention, data regarding the travel time for pulses scattering off an underwater object such as floating mines 106a, 106b, 106c or buried mines 108a, 108b, 108c, or 108d can be processed to locate that that underwater object. By processing data regarding the travel time needed for scattered acoustic pulses from three or more known laser-acoustic pulse source locations to scatter off an underwater object such as a mine and be received by acoustic sensors at known positions, the object's position can be uniquely determined. Using this system, high-probability locations for any underwater targets within a search cell can be obtained. Techniques for determining the location of such underwater objects can include any conventional technique such as triangulation, or more refined techniques using coherent processing of "time-reversed" scattered fields incorporating Bayesian-based methodologies, and all such methods are within the scope of the present disclosure.

Figure 2A:
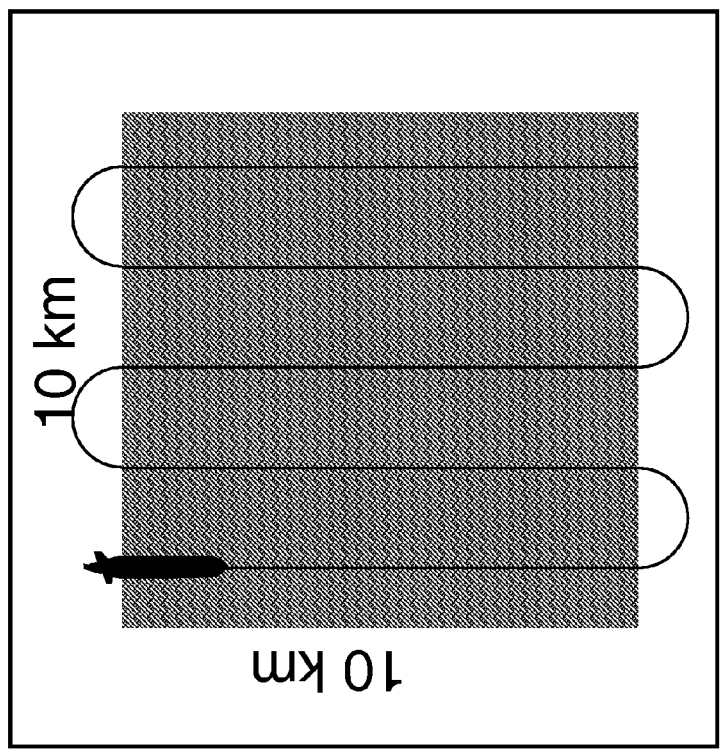
FIGS. 2A and 2B are diagrams showing an exemplary search pattern for a sonar-based search using conventional unmanned underwater vehicle (UUV)—based sonar signals and for a sonar-based search using airborne-based laser-acoustic pulses in accordance with the present invention.
Figure 2B:
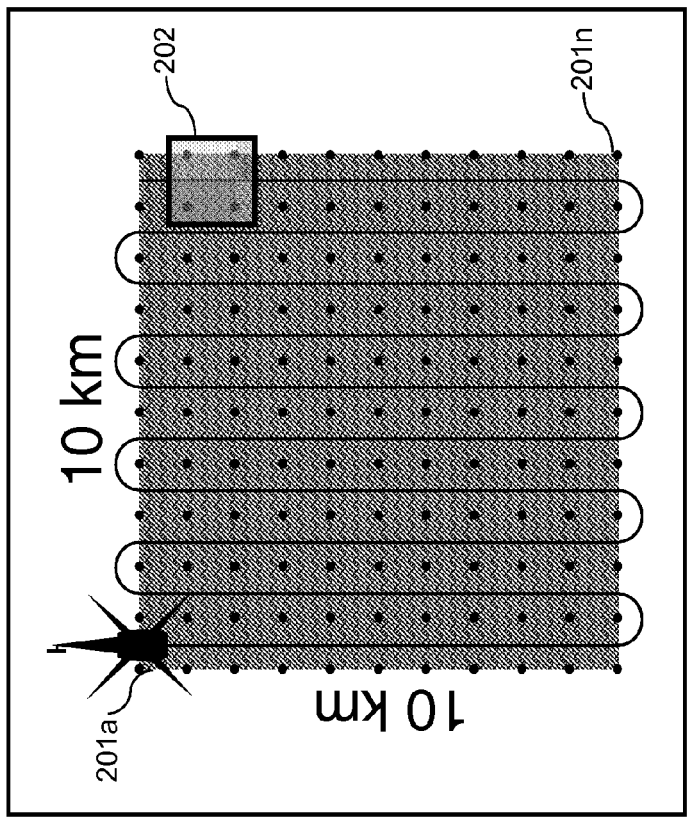

FIGS. 2A and 2B are block diagrams depicting exemplary ways in which searching for underwater objects can occur over an area of the ocean.

FIG. 2A depicts a typical way in which a conventional search of an area of the ocean using acoustic pulses can be conducted. As seen in FIG. 2A, a vessel such as an unmanned underwater vehicle (UUV) can search a 10 km by 10 km area of the ocean using conventional acoustic detection methods such as a "mowing-the-lawn" pattern making multiple passes across one direction of the area, to cover the search area. In a conventional search, an acoustic pulse can be generated by an acoustic source on the UUV. The UUV then can receive the return signals scattered from underwater objects such as mines and can process those returned signals in conventional ways to identify and locate those objects so that they can be avoided and/or eliminated.

One drawback of this conventional method is that it is relatively slow and has relatively limited coverage. As seen in the table in FIG. 2A, if a typical UUV travels at a speed of approximately 3 to 4 knots, and each pass has a swath width of approximately 2 km, it can take from 7 to 10 hours for a search of a 10 km by 10 km area to be completed.

FIG. 2B depicts an exemplary way in which a search of the same area of the ocean can be conducted using the system and method of the present invention. In the method of the invention, an array of acoustic sensors, such as sensors mounted on sonobuoys 201a to 201n at the ocean surface, is deployed via aircraft over a predetermined area with known or determinable positions. In the exemplary configuration shown in FIG. 2B, a 10 km by 10 km square search area is covered by 11 sonobuoys on each side, the sonobuoys being placed approximately 1 km apart.

As seen in FIG. 2B, an area that is surrounded by three or more acoustic sensors comprises a search cell such as cell 202. The maximum size of the search cell for a particular sensor array is determined by, for example, the power spectrum of the acoustic source (e.g., the power spectrum of the laser), object reflectivity, and the acoustic attenuation distance corresponding thereto. In an exemplary embodiment, search cell size is in the range of 0.1 to 1 km, but it will be understood by one skilled in the art that other ranges, both longer and shorter, are possible and are within the scope of the present disclosure.

In accordance with the invention, following deployment of the sonobuoys 201a to 201n, an aircraft, either the aircraft which deployed the sonobuoys or another aircraft, uses a laser to rapidly generate many acoustic pulses within each search cell. In accordance with the invention, a sensor on each sonobuoy 201a to 201n records data regarding the acoustic pulses received by that sonobuoy. As described above, such acoustic pulses can be received via both a direct path and by one or more independent paths scattered from one or more targets, and the recorded data can include the travel time for each pulse and its shape when received. The recorded acoustic pulse data can be transmitted by transmitters mounted on each sonobuoy 201a to 201n to a processor for processing. The data regarding the direct-path acoustic pulses can be used to verify the locations of the deployed sonobuoys. In addition, in accordance with the present invention, the data regarding the direct-path and scattered acoustic pulses generated by the laser pulses can be used can be used to provide high probability locations for targets such as mines or other object within each search cell.

The method of the present invention can permit mine-detection searches to be set up and conducted much faster than searches using conventional methods. As seen from the table in FIG. 2B, an aircraft such as a helicopter can travel at approximately 130 knots, much faster than the 3 to 4 knots travel speed of a UUV. In addition, for any given position of the aircraft, a series of acoustic pulses can be rapidly generated across a large area by simply tilting a beam-steering mirror in a time shorter than the laser repetition period (on the order of 1 millisecond for commercial lasers with relevant pulse energies). Thus, as seen from the table in FIG. 2B, the aircraft can make a series of 1 km wide swaths through the search cells shown in FIG. 2B in about 25 minutes, which is significantly faster than the 7 to 10 hours required to search the same area using a UUV. Even considering the time required to place the sonobuoy receivers, it can easily be seen that a significant time savings can be achieved by the method of the present invention, which can allow more areas to be searched or can free up resources to perform other tasks once the desired search is performed. In addition, the invention could replace personnel and high-value mine detection ships and equipment with inexpensive disposable passive sonobuoys within known or potential mine fields, thus greatly reducing risk to Navy personnel and assets.

Figure 3:
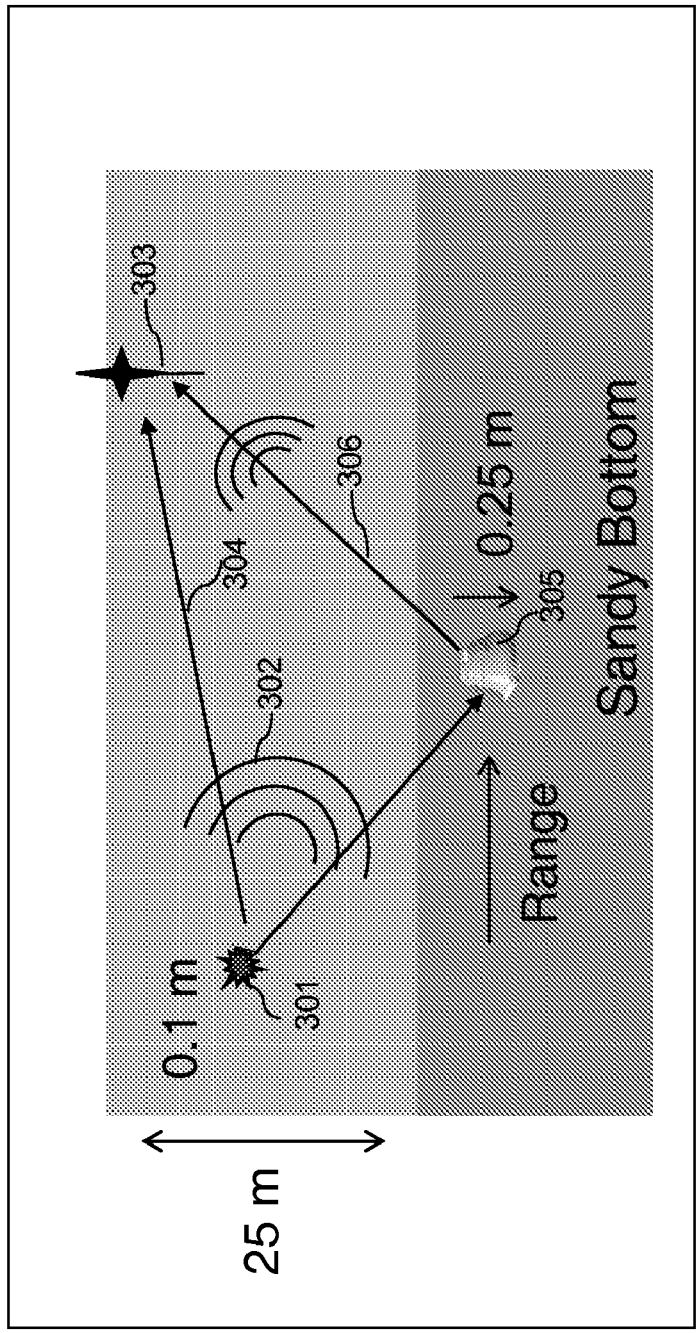
FIG. 3 is a block diagram showing an acoustic pulse propagated from a laser-acoustic pulse source to a buried mine, which in turn reflects it to an acoustic sensor in accordance with the present invention.

FIG. 3 depicts an exemplary way in which a laser-generated acoustic pulse can be received by an acoustic sensor via either a direct or a reflected path for use in locating a mine in accordance with the present invention. As seen in FIG. 3, an underwater laser pulse 301 can generate an acoustic pulse 302 at a chosen depth, typically about 1 meter. Acoustic pulse 302 forms a spherical shell of high pressure which expands outwards with equal intensity in all directions at the speed of sound in the water, and which eventually is received at an acoustic sensor such as sonobuoy 303. As noted above, this pulse can be received by the sensor either as a direct or a scattered pulse. Thus, pulse 302 can be received as a direct pulse via a direct path such as path 304, without scattering from any other objects in the water. In addition, as pulse 302 travels through the water it may also strike an object such as buried mine 305 and be reflected into a scattered pulse traveling along path 306, and this scattered pulse also may be received by sonobuoy 303. Information regarding these direct and scattered pulses can then be transmitted by sonobuoy 303 to a processor at a nearby or remote location and be used as described above to locate the mine so that it can be avoided or cleared without causing damage to ocean vessels.

Figure 4:
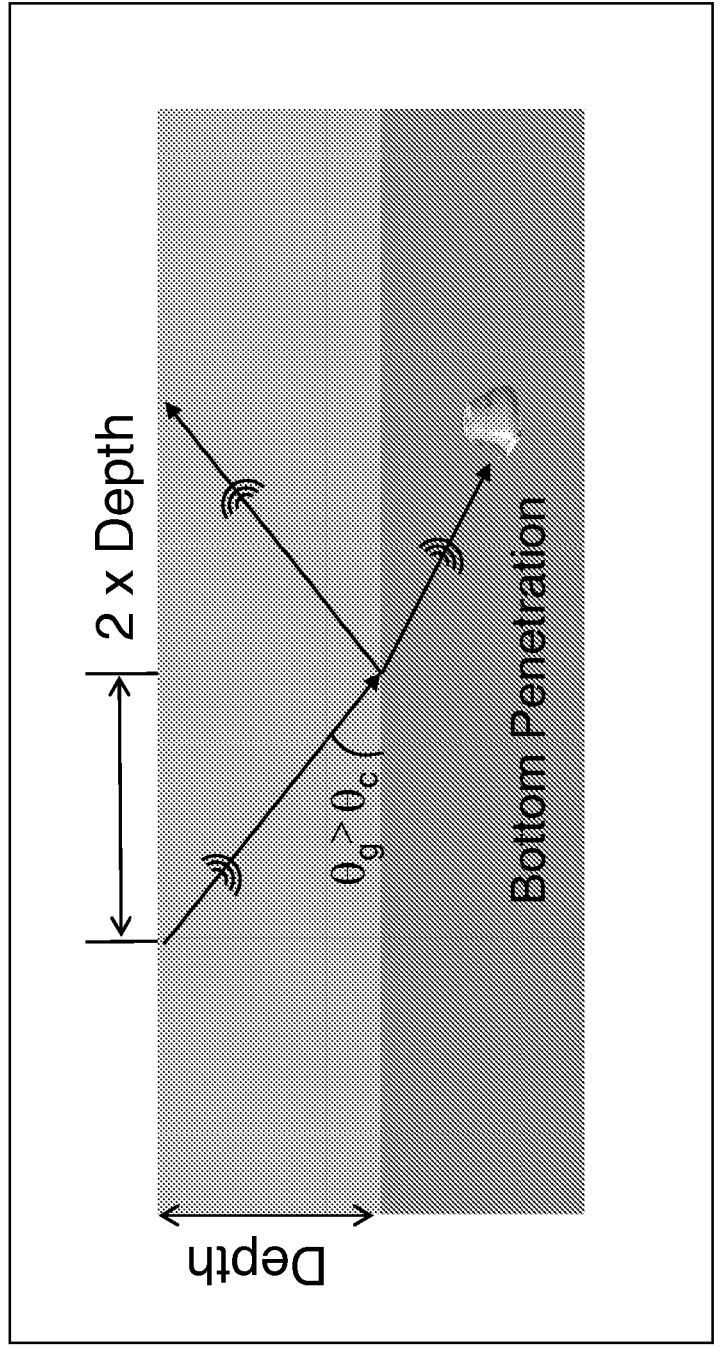
FIG. 4 is a block diagram showing an acoustic pulse propagated from a laser-acoustic pulse source where the acoustic pulse is propagated at an angle θg which is greater than the critical angle θc required for the acoustic pulse to penetrate the ocean floor.

The method of the present invention can provide significantly improved detection of buried objects such as buried mines. As seen in FIG. 4, in a water column which overlays a sediment layer (e.g. a sandy bottom) in which sound travels faster than in the water, there exists a critical angle $\theta_c$ which determines whether an acoustic pulse will penetrate into the bottom. Grazing angles $\theta_g$ below this critical angle $\theta_c$ are perfectly reflected back into the water column, i.e. no sound penetrates into the sediment. If an acoustic pulse travels through the water at an angle less than $\theta_c$, a buried object will not be detected by that pulse. The critical angle therefore determines the minimum separation of acoustic source locations for optimal shallow-buried object detection.

The method of the present invention can overcome this problem in two ways. First, a large number of laser pulses can be fired into the water from the aircraft, providing dense spatial coverage of acoustic source locations such that the grazing angle $\theta_g$ is greater than the critical angle $\theta_c$ for the entire search cell. In addition, acoustic penetration into the sediment is optimized by direct overhead insonification. The method of the present invention, which utilizes acoustic pulses created from laser pulses directly over the sediment, can provide such direct overhead insonification over a large area, increasing the likelihood that such buried objects can be found.

In addition, use of lasers to rapidly generate large numbers of spatially and temporally diverse acoustic pulses can aid in reducing ambiguities in mine localization. A large number of diverse acoustic sources are well-suited for Bayesian-based approaches, which offer improved performance in identifying object locations.

Thus, the ALAMDS provides numerous advantages over both conventional towed-array acoustic sonar systems and other laser-based acoustic sonar systems such as the Navy's LIDAR-based ALMDS. For example, the ALMDS system is limited to conditions with relatively clear water and calm surfaces, and can detect only those object that are in direct line-of-sight of the light pulses, with no capability to detect shallow-buried mines under the surface of the sea floor. In contrast, the ALAMDS technique of the present invention allows rapid aircraft-based sonar searches for underwater floating or shallow buried objects, or objects resting on the ocean bottom. Since the technique is sonar-based, it has the potential to operate in conditions that LIDAR-based detection cannot, such as murky water, or rough sea states. In addition, aircraft-based sonar searches utilizing laser acoustic generation have a potential search rate that is several orders of magnitude faster than conventional sonar searches, greatly increasing the ability to locate and avoid mines and other underwater hazards to sea traffic.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein.

What is claimed is:

1. A method for airborne laser-acoustic detection of an underwater object in a body of water, comprising:

placing a plurality of acoustic sensors into the body of water, the plurality of acoustic sensors comprising an array of acoustic sensors arranged in a pattern configured to provide a predetermined area of coverage in the body of water, a location of each of the acoustic sensors being known, each of the acoustic sensors being configured to receive and transmit data to a processor programmed with appropriate software;

firing, from a laser source, a plurality of laser pulses under the surface of the body of water in a pattern associated with the known locations of the acoustic sensors, each of the laser pulses being configured to generate a corresponding laser-acoustic pulse source as a result of ionization of a volume of the water caused by compression of the laser pulse in the volume of water, wherein the laser pulse is compressed in the water through any combination of: 1) lens focusing, 2) optical group velocity dispersion induced longitudinal compression, and 3) transverse self-focusing via a nonlinear optical Kerr effect, each laser-acoustic pulse source having a predetermined desired shape at a predetermined arbitrary desired underwater location, the underwater laser-acoustic pulse sources generating a corresponding plurality of underwater acoustic pulses traveling through the water;

transmitting data of a location of each of the laser-acoustic pulse sources to the processor;

receiving the acoustic pulses at the acoustic sensors, a received acoustic pulse being received in at least one of a direct path and a scattered path, the scattered path being associated with an underwater object, each of the received acoustic pulses having an acoustic signature associated therewith;

recording data of the acoustic signatures of the received acoustic pulses;

transmitting the recorded data to the processor; and at the processor, transforming the data of the acoustic signatures, together with data of the known locations of the acoustic sensors and the data of the locations of the laser-acoustic pulse sources, into data of a location of the underwater object.

2. The method according to claim 1, wherein the acoustic sensors comprise sonobuoys at the surface of the water.

3. The method according to claim 1, wherein the underwater object is a mine suspended or tethered below the surface of the body of water.

4. The method according to claim 1, further comprising firing at least one of the laser pulses so that it forms at least one acoustic pulse that travels through the water at an angle with respect to a surface of the bottom of the body of water greater than a critical angle, wherein the at least one acoustic pulse penetrates the sediment-water interface at the surface of the bottom of the body of water and into an area of sediment under the surface of the bottom of the body of water, wherein the scattered path of the at least one acoustic pulse is associated with an object in the sediment under the surface of the bottom of the body of water.

5. The method according to claim 4, wherein the located underwater object is the object under the surface of the bottom of the body of water.

6. The method according to claim 1, further comprising transforming, at the processor, the data of the acoustic signature into acoustic pulse data of the received acoustic pulse.

7. The method according to claim 6, wherein the acoustic pulse data comprises data of a travel time of an acoustic pulse generating the acoustic signature, a travel time of the acoustic pulse if received via a direct path being different from a travel time of the acoustic pulse if received via a scattered path, the method further comprising:

transforming, at the processor, the data regarding a travel time for the acoustic pulse received on a direct path into data verifying a location of the laser-acoustic pulse source.

8. The method according to claim 6, wherein the acoustic pulse data comprises data of a shape of the received acoustic pulse, the method further comprising;
   transforming, at the processor, the data of the shape of the received acoustic pulse into data of a location of the underwater object.

9. The method according to claim 1, wherein at least three acoustic sensors at known positions form a search cell, the method further comprising:
   transforming, at the processor, at least a portion of the data of the acoustic signature of the acoustic pulse into data of a travel time of the acoustic pulse after scattering from an underwater object in the search cell; and
   transforming, at the processor, data regarding a plurality of travel times for scattered acoustic pulses from at least three known laser-acoustic pulse source locations, data of the known positions of the acoustic sensors, and data of the known laser-acoustic pulse source locations into data of a location of the underwater object.

10. The method according to claim 1, wherein each of the acoustic sensors includes a global positioning device, the method further comprising determining the location of each of the acoustic sensors based on information generated by its corresponding global positioning system device.

11. The method according to claim 1, wherein the laser source is located on a helicopter.

12. The method according to claim 1, wherein the laser pulse is a frequency chirped laser pulse, the frequency chirped laser pulse being compressed in the water through optical group velocity dispersion induced longitudinal compression, and
   wherein the underwater acoustic pulse is generated as a result of ionization of a volume of the water caused by a presence of the compressed frequency chirped laser pulse in the volume of water.

13. The method according to claim 1, wherein the laser pulse is compressed in the water through transverse self focusing via a nonlinear optical Kerr effect, and
   wherein the underwater acoustic pulse is generated as a result of ionization of a volume of the water caused by a presence of the compressed laser pulse in the volume of water.

14. The method according to claim 1, wherein the underwater laser-acoustic pulse sources are generated at a predetermined underwater location several meters below the surface of the water.

15. A method for airborne laser-acoustic detection of an underwater object in a body of water, comprising:
   firing, from a laser source, a plurality of laser pulses under the surface of the body of water in a pattern associated with known locations of a plurality of acoustic sensors, the plurality of sensors comprising an array of acoustic sensors arranged in a pattern configured to provide a predetermined area of coverage in the body of water, each of the laser pulses being configured to generate a corresponding laser-acoustic pulse source as a result of ionization of a volume of the water caused by compression of the laser pulse in the volume of water, wherein the laser pulse is compressed in the water through any combination of: 1) lens focusing, 2) optical group velocity dispersion induced longitudinal compression, and 3) transverse self-focusing via a nonlinear optical Kerr effect, each laser-acoustic pulse source having a predetermined desired shape at a predetermined arbitrary desired underwater location, the underwater laser-acoustic pulse sources generating a corresponding plurality of underwater acoustic pulses traveling through the water;
   transmitting data of a location of each of the laser-acoustic pulse sources to a processor programmed with appropriate software;
   receiving the acoustic pulses at the acoustic sensors, a received acoustic pulse being received in at least one of a direct path and a scattered path, the scattered path being associated with an underwater object, each of the received acoustic pulses having an acoustic signature associated therewith;
   recording data of the acoustic signatures of the received acoustic pulses;
   transmitting the recorded data to the processor; and
   at the processor, transforming the data of the acoustic signatures, together with data of the known locations of the acoustic sensors and the data of the locations of the laser-acoustic pulse sources, into data of a location of the underwater object.

16. The method according to claim 15, wherein the underwater laser-acoustic pulse sources are generated at a predetermined underwater location several meters below the surface of the water.

* * * * *

UNITED STATES PATENT AND TRADEMARK OFFICE
CERTIFICATE OF CORRECTION

PATENT NO. : 8,228,760 B2
APPLICATION NO. : 12/348925
DATED : July 24, 2012
INVENTOR(S) : Theodore G. Jones et al.

Page 1 of 1

It is certified that error appears in the above-identified patent and that said Letters Patent is hereby corrected as shown below:

On the Title Page

Item (75) correct the name of the second named inventor from:

"Tsih C. Tang"

To

"Tsih C. Yang"

Signed and Sealed this
Ninth Day of July, 2013

Teresa Stanek Rea
*Acting Director of the United States Patent and Trademark Office*